United States Patent
Dryden et al.

(10) Patent No.: US 7,224,746 B2
(45) Date of Patent: May 29, 2007

(54) PRE-COMPENSATION FOR DIGITAL BIT STREAMS

(75) Inventors: Cameron Dryden, West Roxbury, MA (US); Bruce D. Rubenstein, Lexington, MA (US)

(73) Assignee: Teradyne, Inc, North Reading, MA (US)

( * ) Notice: Subject to any disclaimer, the term of this patent is extended or adjusted under 35 U.S.C. 154(b) by 748 days.

(21) Appl. No.: 10/335,379

(22) Filed: Dec. 31, 2002

(65) Prior Publication Data

US 2004/0125887 A1    Jul. 1, 2004

(51) Int. Cl.
*H04B 15/00*    (2006.01)

(52) U.S. Cl. .................. 375/285; 375/295; 375/296

(58) Field of Classification Search ............. 375/285, 375/295, 296, 312, 286, 297
See application file for complete search history.

(56) References Cited

U.S. PATENT DOCUMENTS

| | | | |
|---|---|---|---|
| 4,584,690 A * | 4/1986 | Cafiero et al. ............. 375/290 |
| 6,466,626 B1 * | 10/2002 | Cecchi et al. ............. 375/257 |
| 6,566,891 B1 * | 5/2003 | Aggarwal et al. .......... 324/620 |
| 6,647,041 B1 * | 11/2003 | Verma et al. ............ 372/45.01 |
| 6,690,744 B2 * | 2/2004 | Hedberg .................... 375/296 |
| 6,873,218 B2 * | 3/2005 | Khlat ........................ 332/103 |
| 2002/0194560 A1 * | 12/2002 | Jain et al. .................. 714/724 |
| 2004/0096022 A1 * | 5/2004 | Zhang ....................... 375/353 |

\* cited by examiner

*Primary Examiner*—Jay K. Patel
*Assistant Examiner*—Curtis B. Odom
(74) *Attorney, Agent, or Firm*—Bruce D. Rubenstein

(57) ABSTRACT

A technique for pre-compensating a digital bit stream for distortion imposed by a transmission path includes adjusting the level of the digital bit stream on a bit-by-bit basis in a manner that simulates the effects of a filter having a transfer function that is substantially the inverse of that of the transmission path. The technique includes generating a plurality of reference levels that correspond to correcting levels of the digital bit stream and switching these levels to the transmission path at high speed in response to the current bit of the digital bit stream and at least one previous bit. When used in an automatic test system, the technique improves signal transmission and reduces jitter, therefore allowing jitter of devices under test to be measured more accurately.

11 Claims, 3 Drawing Sheets

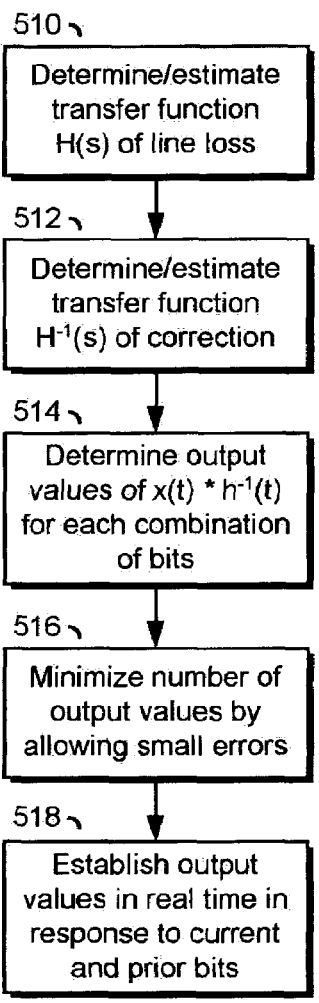
Fig. 5
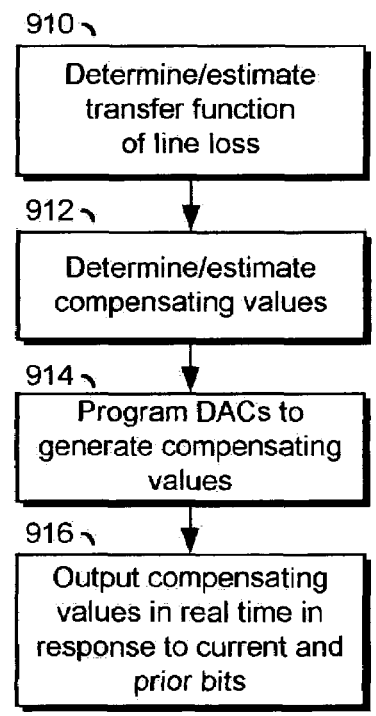
Fig. 6
Fig. 9
| $D_{-3}$ | $D_{-2}$ | $D_{-1}$ | $D_0$ | SIG ADJ | $D_{-3}$ | $D_{-2}$ | $D_{-1}$ | $D_0$ | SIG ADJ |
|---|---|---|---|---|---|---|---|---|---|
| 0 | 0 | 0 | 0 | $V_0$ | 1 | 0 | 0 | 0 | $V_8$ |
| 0 | 0 | 0 | 1 | $V_1$ | 1 | 0 | 0 | 1 | $V_9$ |
| 0 | 0 | 1 | 0 | $V_2$ | 1 | 0 | 1 | 0 | $V_{10}$ |
| 0 | 0 | 1 | 1 | $V_3$ | 1 | 0 | 1 | 1 | $V_{11}$ |
| 0 | 1 | 0 | 0 | $V_4$ | 1 | 1 | 0 | 0 | $V_{12}$ |
| 0 | 1 | 0 | 1 | $V_5$ | 1 | 1 | 0 | 1 | $V_{13}$ |
| 0 | 1 | 1 | 0 | $V_6$ | 1 | 1 | 1 | 0 | $V_{14}$ |
| 0 | 1 | 1 | 1 | $V_7$ | 1 | 1 | 1 | 1 | $V_{15}$ |

PRE-COMPENSATION FOR DIGITAL BIT STREAMS

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable

BACKGROUND OF THE INVENTION

1. Field of the Invention

This invention relates generally to high-speed signal delivery, and, more particularly, to techniques for compensating for distortion suffered by high-speed digital signals transmitted through band-limited channels.

2. Description of Related Art

With the advent of high-speed technologies such as Ser-Des and SONET, which operate at speeds above 1 GBit/s, the interconnections between devices have assumed an important role in limiting overall system speed. Transmission paths between devices or portions of electronic systems impose losses. These losses can attenuate digital signals to a point where they cannot reliably be received. They can also induce timing variations, or jitter.

FIG. 1 shows a conventional circuit for transmitting and receiving a digital bit stream, here a serial bit stream. A memory 110 stores N-bit digital data. The N-bit data is clocked out of the memory 110, and a serializer 112 converts the N-bit data into a serial bit stream "SIG IN" having a bit rate that is N times the memory clocking rate. A driver 114 buffers the serial bit stream to generate "SIG TR," and sends SIG TR down a transmission path 116. The transmission path generally attenuates or otherwise distorts SIG TR, so that the output "SIG REC" of the transmission path 116 is a distorted version of SIG TR. A comparator 118 receives SIG REC and compares it with a threshold level to generate an output signal, "SIG OUT."

As shown in FIG. 2, SIG OUT may not accurately represent SIG IN, depending on the losses in the transmission path 116 and the speed of signals transmitted. Short pulses may be attenuated to a point where they are not received at all. Assuming they are received, they may be significantly shortened in width and are subject to increased jitter. Longer pulses also suffer from timing errors, because they are delayed by the distorting characteristics of the transmission path 116. In addition, pulsewidths of both long and short pulses are distorted, owing to differences between risetimes and falltimes of signals passed through the transmission path.

We have recognized, as shown in FIG. 3, that the distortion imposed by the transmission path 116 can be described by a transfer function $H(s)$. To pre-compensate for the distortion induced by $H(s)$, we observe that one need only pass the bit stream through a filter 310 having a transfer function $H^{-1}(s)$. The effects of the filter 310 then balance the distortion of the transmission path 116, to produce a receiver signal SIG REC that accurately resembles SIG IN.

Realizing this type of filter tends to be difficult in practice, however. Analog filters for high frequency signals tend to be physically large. In addition, optimal characteristics are often difficult to establish or change to accommodate different transmission paths. Although they are usually smaller and more flexible, digital filters present drawbacks as well. Because they involve mathematical operations, such as addition and multiplication, they tend to be ill suited for extremely fast signals that change faster than a digital filter's mathematical circuits can handle.

What would be desirable is a compensation technique that could be realized in a small area, could be readily adapted for different transmission paths, and could be operated on extremely fast digital bit streams.

BRIEF SUMMARY OF THE INVENTION

With the foregoing background in mind, it is an object of the invention to compensate, at least partially, for distortion in high-speed bit streams imposed by band-limited transmission paths.

To achieve the foregoing object, as well as other objectives and advantages, the signal level of a digital bit stream to be inputted to a distorting transmission path is effectively pre-compensated for distortion by correcting the bit stream's amplitude on a bit-by-bit or less frequent basis. A plurality of signal levels are established. One of these signal levels, or a combination of them, is selected at a time for establishing an input to the transmission path, based on the current bit and at least one previous bit of the digital bit stream. The selected levels of the pre-compensated bit stream effectively counteract the distortion imposed by the transmission path and yield a significantly improved signal at the output of the transmission path.

BRIEF DESCRIPTION OF THE DRAWINGS

Additional objects, advantages, and novel features of the invention will become apparent from a consideration of the ensuing description and drawings, in which—

FIG. 5 is a flowchart of a process according to the invention for compensating for distortion of a digital bit stream through a particular transmission path;

FIG. 6 is a table showing relationships between output values and bits as used in the circuit of FIG. 4;

FIG. 9 is a flowchart of a process according to the invention for adjustably compensating for distortion of digital bit streams through transmission paths in general.

DETAILED DESCRIPTION OF THE PREFERRED EMBODIMENT

Figure 1:
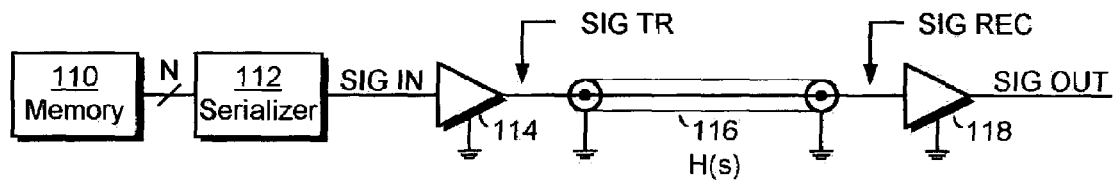
FIG. 1 is a simplified schematic of a circuit for transmitting and receiving a digital bit stream.
Figure 2:
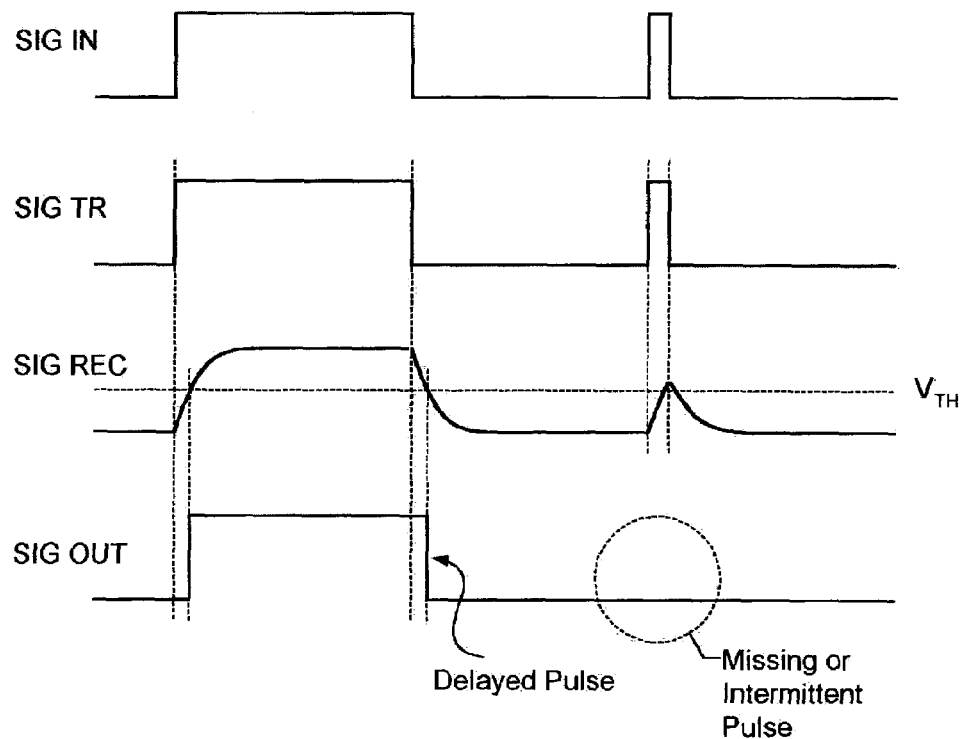
FIG. 2 is a timing diagram showing electronic signals from the circuit of FIG. 1.
Figure 3:
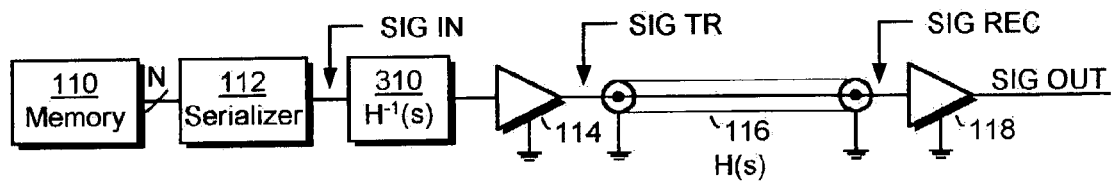
FIG. 3 is a simplified schematic of the circuit of FIG. 1 equipped with an adjusting circuit for compensating distortion imposed by the transmission path.
Figure 4:
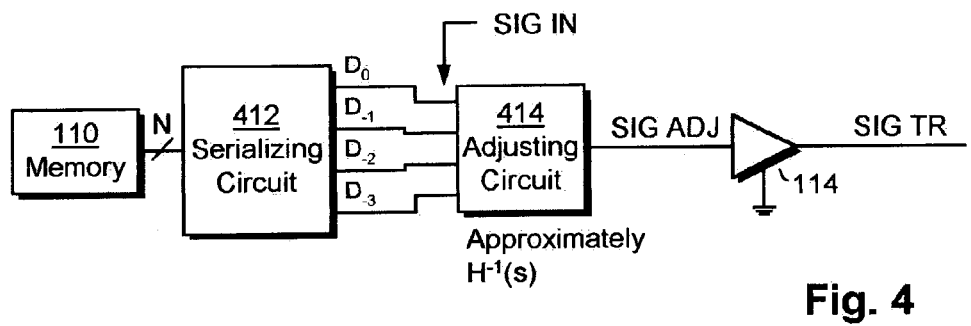
FIG. 4 is a simplified schematic of a circuit according to the invention for compensating distortion in response to a current bit and at least one previous bit.

FIG. 4 shows an illustrative embodiment of the invention. As with the prior art, a memory 110 provides N-bit parallel data to a serializing circuit, which converts the N-bit parallel data to 1-bit serial data. The serializing circuit 412 differs from the serializer 112 of FIGS. 1 and 3, however, in that it provides output not only for the current bit ($D_0$), but also for a plurality of immediately preceding bits ($D_{-1}$, $D_{-2}$, $D_{-3}$). Illustrative examples of the serializing circuit 412 include shift registers and cyclic latching multiplexors.

The output bits $D_{-3}$–$D_0$ from the serializing circuit 412 are applied to an adjusting circuit 414. The role of the adjusting circuit 414 is preferably to approximate the behavior of a filter having a transfer function $H^{-1}(s)$. The adjusting circuit produces an output signal SIG ADJ, which generally (but not necessarily) is buffered to provide SIG IN, the input signal to the transmission path 116.

The adjusting circuit 414 approximates H(s) by applying predetermined and pre-established reference levels to its output. The reference levels can be voltages, currents, or combinations of voltages and currents. We have observed that, for a digital signal that alternates between discrete levels, a finite and relatively small number of reference levels can be used to pre-compensate a digital bit stream.

FIG. 5 shows a process whereby the adjusting circuit 414 accomplishes its filtering operation. At step 510, the transfer function H(s) of the transmission path 116 is determined. H(s) can be measured directly (e.g., using a spectrum analyzer) or can be estimated or otherwise deduced. The desired transfer function, $H^{-1}(s)$, of the adjusting circuit is then computed, estimated, or otherwise deduced at step 512.

At step 514, we determine the value of each reference level $V_R$. In general, a unique reference level $V_R$ is associated with each unique combination of bits inputted to the adjusting circuit 414 (see FIG. 6). If we let x(t) be the input to the adjusting circuit as a function of time (i.e., the serial bit stream, or $D_0$), and we let y(t) be the output (SIG ADJ) of the adjusting circuit, then $$y(t)=x(t)*h^{-1}(t) \tag{EQ. 1}$$

where $h^{-1}(t)$ is the inverse Laplace transform of H(s), and "*" denotes convolution. Using signal processing software, manual techniques, or other means, each value of $x(t)*h^{-1}(t)$, and thus $V_R$, can be computed for each combination of the current bit and preceding bits.

With the values of $V_R$ determined, different reference circuits can be provided to establish the different reference levels. The adjusting circuit 414 then accomplishes its filtering operation simply by matching reference levels to input codes in real time, and then outputting the matching reference levels (step 518). Since the dynamics H(s) of the transmission path are likely to remain stable over time, the values of $V_R$ can be determined once and then permanently designed into the adjusting circuit 414.

Although a unique reference level will generally correspond to each code combination, the number of reference circuits actually implemented can be varied. Circuits generally operate faster when they are kept smaller and simpler. Therefore, the number of reference circuits is preferably reduced by grouping together reference levels that approximately equal one another, and then providing a single reference level to represent each group. This aspect of implementation is shown in step 516. Each representative level may be one of the references $V_R$ within the respective group, an average of the levels within the group, or some other value that fits the different levels of the group.

The adjusting circuit 414 preferably includes logic for ensuring that the representative level for each group is selected whenever an input code arises that corresponds to any member of the respective group. The number of groups implemented is thus a matter of design choice and depends upon a balancing of various factors, including circuit size, complexity, desired filtering accuracy, and timing performance of the requisite logic.

Figure 7:
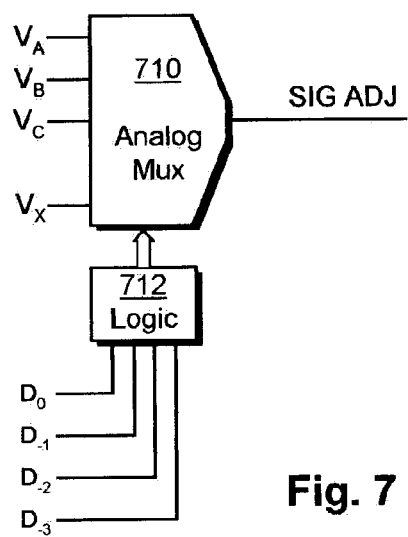
FIG. 7 is a simplified schematic of a first embodiment of an adjusting circuit suitable for use in the circuit of FIG. 4.
Figure 8:
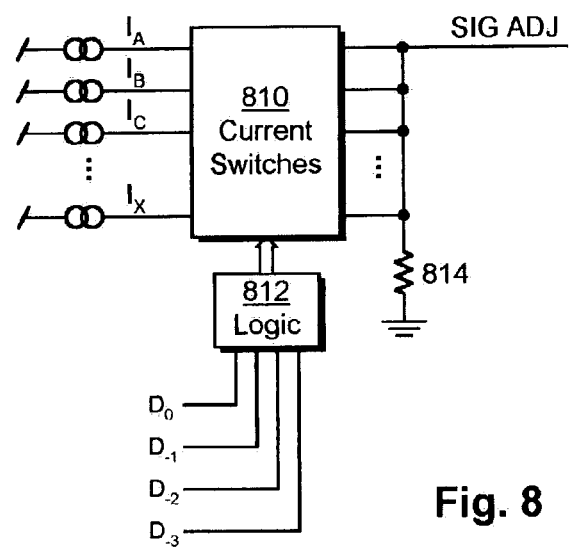
FIG. 8 is a simplified schematic of a second embodiment of an adjusting circuit suitable for use in the circuit of FIG. 4.

FIGS. 7 and 8 show two illustrative implementations of the adjusting circuit 414. In FIG. 7, reference levels are provided as voltages, and the voltages are switched to the output of the adjusting circuit 414 via analog switches, shown collectively as an analog mux 710. A logic circuit 712 selects from among different reference voltages $V_A$–$V_X$, based on the input codes $D_{-3}$–$D_0$ from the serializing circuit 412. Depending on the implementation, the logic circuit 712 may select from references that correspond to specific codes, references that correspond to representatives of groups, or combinations of the two.

In FIG. 8, reference levels are provided as currents, which are switched to the output of the adjusting circuit 414 via devices shown collectively as current switches 810. The individual devices from which the current switches 810 are comprised can be analog switches, transistors implemented as switches, current mirrors, or any suitable circuits for producing an output current in response to a selected input current. The outputs of the current switches 810 are preferably tied together and to a resistor 814, which converts the selected current into a voltage to be buffered and inputted to the transmission path 116.

In many instances, current switching can attain higher speeds than voltage switching. In these instances, it is preferable to omit the resistor 814 and the transmitter 11 (see FIG. 1) and provide the current reference level directly to the transmission path 116. To convert the output current to a voltage, a termination resistor (not shown) can be provided at the input of the receiver 118.

The pre-compensation technique described herein is preferably used in an automatic test system (i.e., a "tester") for testing newly manufactured semiconductor devices, or for testing devices at various stages of the manufacturing process. The technique can compensate for path losses between a digital transmitter circuit and a DUT (device under test), thereby delivering test signals to the DUT with improved signal integrity. Gains in signal integrity allow a tester to discern the characteristics of DUTs more accurately. This is particularly the case for measuring timing characteristics such as jitter. Although the technique described herein is well suited for automatic test systems, it can be applied in any application in which signal delivery can be improved by pre-compensation of digital bit streams.

Alternatives

Having described one embodiment, numerous alternative embodiments or variations can be made. For instance, as shown and described herein, reference values for the adjusting circuit 414 are determined once and then permanently implemented with voltage and/or current reference circuits. The reference circuits can be made adjustable, however, for accommodating transmission paths with different characteristics. This variation is shown in FIG. 9. After H(s) and the compensating values $V_R$ are determined (steps 910 and 912), digital-to-analog converters (DACs) can generate these values (step 914). The references generated by the DACs can then be outputted based on input code, as described above (step 916). Significantly, these DACs can be programmed to correct for distortion in situ. Thus, a circuit that embodies the adjusting circuit 414 can be made portable for adapting to different transmission paths in different environments. Programmable logic can manage grouping of reference circuits to reduce component count, if desired. Alternatively, separate reference circuits can be provided for each input code to the adjusting circuit 414.

Another way of reducing component count is to form certain reference levels from combinations of other reference levels. For example, voltage references can be added by connecting voltage sources in series. Likewise, current references can be added by connecting together the outputs of individual current sources.

As shown and described herein, the adjusting circuit 414 receives a total of three preceding bits, $D_{-3}$, $D_{-2}$, and $D_{-1}$, in addition to the current bit $D_0$. It should be noted that this choice of three preceding bits is merely illustrative. In any particular implementation, the optimal number of preceding bits can be determined by considering a variety of factors, including the transfer function H(s) of the transmission path, the bit rate of the output data stream, and the desired level of correction. Given the same bit rate, transmission paths with longer time constants generally benefit more from greater numbers of preceding bits, because they take longer to settle and thus require correction over longer periods of time. In general, the greater the number of preceding bits, the greater the accuracy of correction. Adding more bits involves diminishing returns, however, because the number of reference levels, if each reference level is to be implemented separately, goes up exponentially with the number of bits. Therefore, we believe that optimal results can be attained by setting the number of bits to a value that spans a period of time equivalent to about two or three time constants of H(s). For accurate DC performance, it is desirable that the bit stream be allowed to settle to stable high and low logic levels. For example, if the total number of bits is four and $D_{-3}$–$D_0$ equals "1111," then the output of the adjusting circuit 414 should be the signal level that corresponds to a logic level "1." Similarly, if $D_{-3}$–$D_0$ equals "0000," then the output of the adjusting filter should be the signal level that corresponds to a logic level "0." To do otherwise would cause the adjusting circuit never to provide proper voltage levels.

Correction need not be perfect. Although the reference values $V_R$ are preferably obtained through an accurate measurement of H(s), this is not required. Some correction is generally better than no correction, and simply estimating the values $V_R$ can often provide adequate results.

Pre-compensation need not be aimed merely at restoring the shape of the original bit stream. It may also be used to produce a desired shape that differs from that of the original bit stream. To illustrate, one could design the adjusting circuit 414 with a transfer function $H^{-1}(s)D(s)$, where D(s) is a desired transfer function by which the data stream is to be tailored.

We have described above how the adjusting circuit 414 compensates for distortion imposed by the transmission path 116. The pre-compensation technique can be used to correct for distortion imposed by the transmitter 114, receiver 118, or any other elements in the circuit.

The form of compensation described, i.e., approximating $H^{-1}(s)$, performs an approximately linear, time invariant correction on the bit stream. Circuit behavior can include significant non-linear effects, however, particularly at high speeds. These may include asymmetries between risetimes and falltimes of the transmitter 114 and receiver 118 that last for longer than one bit, skin effect, and hysteresis. By appropriately setting the reference levels, the adjusting circuit 414 can be tailored to compensate these and other non-linear effects.

In addition, the actions of the adjusting circuit 414 can be used to optimize particular characteristics of the transmitted data stream. For example, one may wish to provide the lowest jitter, or the smallest common mode error, even at the expense of increased errors in other areas. Appropriate settings of the reference levels allow the adjusting circuit 414 to be tailored for optimizing a variety of these characteristics.

As shown and described herein, the adjusting circuit 414 provides its output as a single level, based on the combination of the current bit and the previous bits. Alternatively, the adjusting circuit can provide its output in two parts—a first part for the current bit and a second part for the correction, which would then be added or subtracted from the current bit. The approach we have chosen appears to be simpler, but this is a matter of design choice.

In the illustrative embodiment described herein, the adjusting circuit 414 selects a reference for each bit of the digital bit stream, i.e., at the bit rate. Where output data and corrections are provided separately, as described above, it may be permissible to skip correction for certain bits. Thus, for instance, the adjusting circuit can be constructed to correct every second bit, every third bit, or, more generally, every $M^{th}$ bit. Bits between corrections simply hold previous correction values. Data continues to be outputted at the bit rate, but corrected values are updated at one-$M^{th}$ the bit rate.

In some instances, it may be desirable to base a correction not only on the current and previous bits, but on one or more fixture bits as well. The adjusting circuit 414 is readily adaptable for this purpose. For example, bits $D_{-3}$–$D_{-1}$ can be renamed as bits $D_{-2}$–$D_0$, and bit $D_0$ can be renamed as bit $D_{+}1$. The correction levels $V_R$ can then be recomputed to achieve the desired balance of correction between past, present, and future bits.

Although the embodiment disclosed herein applies to serial bit streams, the correction technique is also applicable to individual data lines of parallel bit streams. In addition, although binary logic has been assumed herein, the correction technique can also be extended to digital systems having three or more discrete levels. Also, although the invention has been shown and described for single-ended signals, the pre-compensation technique can be readily applied to both single-ended and differential signals.

Therefore, while the invention has been particularly shown and described with reference to the preferred embodiments thereof, it will be understood by those skilled in the art that various changes in form and detail may be made therein without departing from the spirit and scope of the invention.

What is claimed is:

1. A method of compensating a digital bit stream for distortion in a transmission path through which the bit stream is to be passed, comprising:
    establishing a plurality of reference levels corresponding to compensating inputs to the transmission path; and
    for different bits of the bit stream, selecting at least one of the plurality of reference levels for providing a compensated input to the transmission path,
    wherein the selection of the at least one reference level is based on a current bit and at least one previous bit of the bit stream, wherein H(s) is the transfer function of the transmission path and the step of selecting includes simulating the behavior of a filter having a transfer function that approximates $H^{-1}(s)$, and wherein x(t) is the digital bit stream and the plurality of reference levels substantially correspond to different values of $x(t)*h^{-1}(t)$, wherein $h^{-1}(t)$ is the inverse Laplace transform of $H^{-1}(s)$ and "*" denotes convolution.

2. A method as recited in claim 1, wherein the plurality of reference levels are voltage levels, and the step of selecting comprises coupling said at least one of the voltage levels to the transmission path.

3. A method as recited in claim 1, wherein the plurality of reference levels are current levels, and the step of selecting comprises coupling said at least one of the current levels to the transmission path.

4. A method as recited in claim 1, further comprising:
allowing at least one of the plurality of reference levels to have a predetermined error;
assigning reference levels having values that are approximately equal to different groups; and
providing a representative reference level for each group, wherein the step of selecting comprises selecting from among the representative levels.

5. A method as recited in claim 1, wherein the plurality of reference levels are adjustable for establishing different values in response to different distortion characteristics of transmission paths.

6. A circuit for compensating a digital bit stream for losses in a transmission path through which the bit stream is to be passed, comprising:
a plurality of reference circuits for generating reference levels corresponding to compensating inputs to the transmission path; and
means for selecting at least one of the reference levels for provision to the input of the transmission path on a bit-by-bit basis, responsive to a current bit and at least one previous bit of the digital bit stream,
wherein H(s) is the transfer function of the transmission path and the means for selecting includes means for simulating the behavior of a filter having a transfer function that approximates $H^{-1}(s)$, and
wherein x(t) is the digital bit stream and the plurality of reference levels substantially correspond to different values of $x(t)*h^{-1}(t)$, wherein $h^{-1}(t)$ is the inverse Laplace transform of $H^{-1}(s)$ and "*" denotes convolution.

7. A circuit as recited in claim 6, wherein the reference levels are any of voltage reference levels and current reference levels.

8. A circuit as recited in claim 6, wherein the digital bit stream is a serial bit stream operating in excess of 1 GBit/s.

9. A circuit as recited in claim 8, wherein the means for selecting comprises high speed means for switching the reference levels to the transmission path.

10. A method of manufacturing an integrated circuit that includes testing the integrated circuit at least one time during a manufacturing process, wherein the testing includes—
generating a digital bit stream;
applying the digital bit stream to the integrated circuit;
measuring an output from the integrated circuit in response to the digital bit stream; and
testing whether the measured output is within predetermined limits,
wherein the step of generating includes compensating the digital bit stream for distortion in a transmission path through which the bit stream is to be passed, including establishing a plurality of reference levels corresponding to compensating inputs to the transmission path and, for different bits of the bit stream, selecting at least one of the plurality of reference levels for providing a compensated input to the transmission path, wherein the selection of the at least one reference level is based on a current bit and at least one previous bit of the bit stream
wherein H(s) is the transfer function of the transmission path and the step of selecting includes simulating the behavior of a filter having a transfer function that approximates $H^{-1}(s)$, and
wherein x(t) is the digital bit stream and the plurality of reference levels substantially correspond to different values of $x(t)*h^{-1}(t)$, wherein $h^-(t)$ is the inverse Laplace transform of $H^{-1}(s)$ and "*" denotes convolution.

11. A method as recited in claim 10, further comprising repeating the steps of generating, applying, and measuring, wherein the step of testing includes testing jitter of the integrated circuit.

\* \* \* \* \*